Jan. 6, 1925.
J. H. DONAT
HOISTING MECHANISM
Filed April 13, 1923
1,522,463
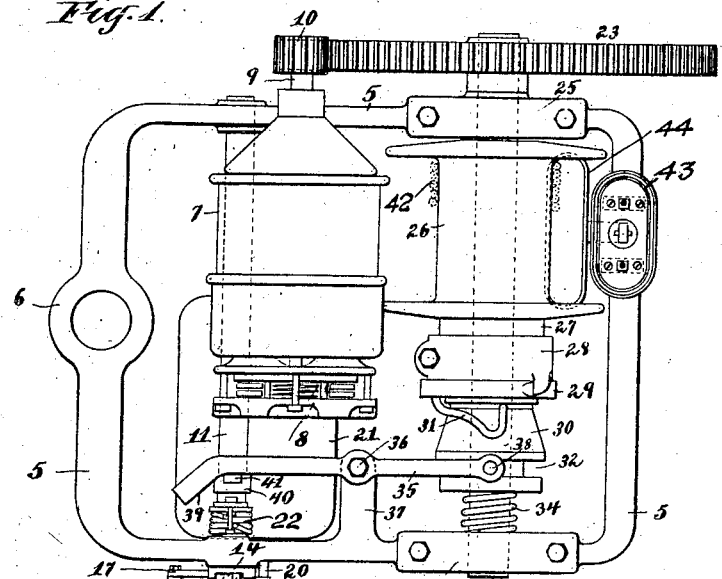
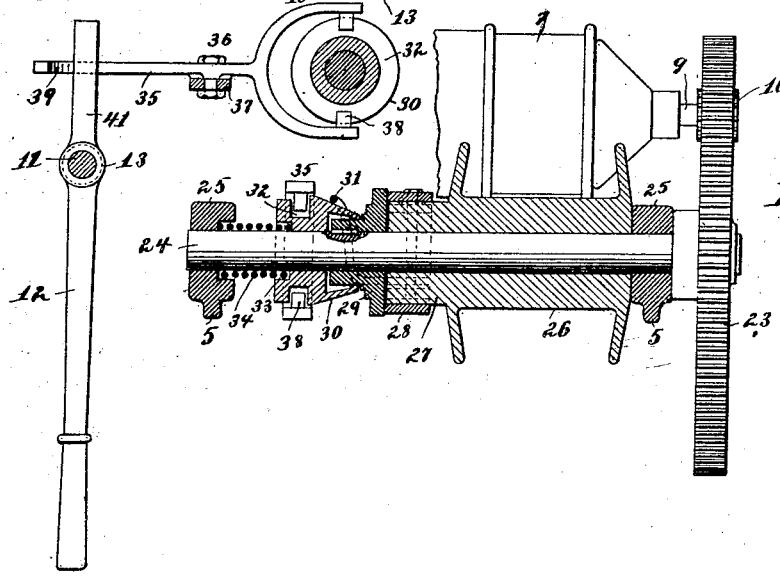
Inventor:
Joseph H. Donat
by his attorney,
Charles R. Searle.

Patented Jan. 6, 1925.

1,522,463

UNITED STATES PATENT OFFICE.

JOSEPH H. DONAT, OF NEW YORK, N. Y., ASSIGNOR TO GILLIS & GEOGHEGAN, OF NEW YORK, N. Y., A FIRM.

HOISTING MECHANISM.

Application filed April 13, 1923. Serial No. 631,793.

*To all whom it may concern:*

Be it known that I, JOSEPH H. DONAT, a citizen of the United States, residing in the city of New York, borough and county of Queens, in the State of New York, have invented a certain new and useful Improvement in Hoisting Mechanism, of which the following is a specification.

The invention relates to power driven hoisting mechanism and more particularly to ash-hoists operated electrically and designed to raise ash cans and like loads from a cellar to the sidewalk, of the type shown in Letters Patent of the United States granted to Joseph H. Donat, dated March 9, 1920, No. 1,333,064, upon which the present invention is based.

The object of the invention is to provide simplified and less expensive mechanism for performing the required operations as set forth in the above Letters Patent, and the invention consists in certain novel features and details of construction by which the above and other objects are attained, to be hereinafter described and claimed.

The accompanying drawings form a part of this specification and show an approved form of the invention.

Figure 1 is a plan view of a hoisting head constructed in accordance with the invention.

Figure 2 is a vertical transverse section through such head, taken on the line 2—2 in Figure 1, and partly in elevation.

Figure 3 is a side elevation of the controlling lever and certain other portions, partly in vertical section.

Similar reference numerals indicate the same parts in all the figures.

The horizontally disposed frame of the head is marked 5 and has a cylindrical boss 6 disposed vertically and adapted to be mounted upon a standard, not shown, which may be understood to be as usual and equipped with elevating and lowering means of suitable construction.

Mounted transversely on the frame is an electric motor 7 having a magnetic brake mechanism 8, and a motor shaft 9 carrying at its outer end a pinion 10. The motor is controlled by the movements of an operating shaft 11 mounted in the frame 5 and oscillated by a controlling lever 12 having a boss 13 keyed upon the overhung end of the shaft 11.

Between the boss 13 and the frame is a collar 14 loosely mounted on the operating shaft 11, having a wide circumferential notch 15 in its face receiving a narrower lug 16 on the adjacent face of the boss 13, the arrangement being such that a movement of the controller lever to the left will partially rotate the collar 14 with the shaft 11, while the collar will be unaffected by a movement of the ever to the right within the limits of the lever to the length of notch 15 which thus provides the required lost motion. On the collar is an arm 17 projecting radially, connected by a link 18 to a crank-arm 19 on the controller-shaft 20 extending into the controller-box 21 and operating a switch, not shown, in the latter and controlling the current to the motor 7. This mechanism is similar to that shown in Letters Patent granted to Arthur Falkenau, No. 1,452,964 dated April 24, 1923, and, with the spring-actuated mechanism 22 on the operating-shaft 11 for automatically returning the controlling lever 12 to the central or neutral position, and for returning the controller shaft 20 and collar 14 to the original neutral position when the controlling lever 12 is brought back to neutral is fully shown and described in such patent. For this purpose, the controller shaft 20 is provided with a spring-actuated mechanism, not shown but similar to the above-mentioned spring-actuated mechanism 22, located within the controller box 21, for returning the controller shaft to the neutral normal position when free and correspondingly moving the collar 14 to the neutral position shown in Figure 1.

The pinion 10 engages the teeth of a gear-wheel 23 fixedly mounted on the overhung end of the hoisting shaft 24 extending transversely of the frame 5 and supported in bearings 25 thereon in which it is free to rotate.

On the shaft 24 adjacent the gearwheel 23, is a flanged hoisting-drum 26 loosely mounted, and carries a drum or hub 27 engaged by a friction band 28 forming part of a clutch 29 keyed on the shaft 24 and operated by a cone 30 slidably mounted on the shaft. By the movements of the cone relatively to the clutch arm 31. the frictional engagement of the band 28 with the hub 27 is varied. The clutch shown is known as the "Conway" and is preferred, but any suitable friction clutch may be employed.

The cone 30 has an annular groove 32 in its base, and is recessed at 33 to receive an end of a helical expansion spring 34 encircling the shaft 24 and abutting at one end against the frame 5 and at the other against the cone, exerting its force in the direction to hold the clutch normally in strong frictional engagement with the hub 27 of the hoisting drum 26 and cause the latter to rotate with the hoisting shaft 24 when thus engaged.

The cone is moved axially from the hoisting drum in opposition to the force of the spring 34 by a horizontally disposed forked shifting lever 35 pivotally mounted at 36 on an arm 37 projecting inwardly from the frame 5, and has pins 38 lying in the groove 32 of the cone. The opposite end of the lever 35 extends above the operating shaft 11 and has an outwardly inclined face 39.

On the operating shaft 11 is fixed a collar 40 having an upwardly extended arm 41 standing adjacent the inclined end 39 of the shifting lever and arranged to contact with the angular face of the latter when the controlling lever 12 is thrown to the right and thus swing the shifting lever and move the cone in the direction to release the grip of the band 28 on the hub 27 and permit the hoisting drum 26 to turn independently upon the shaft 24 in the direction to lower the load suspended by a cable 42, shown in dotted lines in Figure 1, wound upon the hoisting drum 26.

The operation is as follows:—Assuming that a load is to be raised, the controlling lever 12 is swung to the left which movement by the engagement of the lug 16 with the collar 14 turns the latter and through the connections 17, 18 and 19 turns the controller shaft 20 and throws the switch, not shown, in the controller box 21 in the direction to supply current and actuate the motor to turn the pinion 10. The latter by its meshing with the gearwheel 23 turns the hoisting shaft 24, and as the clutch 29 is keyed on the shaft and held in strong frictional engagement with the hoisting drum 26 by the force of the spring 34, the hoisting drum is caused to rotate with the shaft and the load is lifted.

By returning the controlling lever to the central or neutral position, to which it will be returned automatically if released, by the action of the mechanism 22, the current will cut off and the load remain stationarily suspended by the engagement of the now stationary pinion 10 with the gearwheel 23, the magnetic brake mechanism 8 aiding to resist rotation of the motor shaft under these conditions.

In lowering the load the controlling lever is swung to the right, the lost motion afforded by the notch 15 and lug 16 permitting such movement without imparting motion to the controller shaft 20, and the action of the arm 41 on the inclined end 39 of the shifting lever 35 swings the latter and slides the cone in opposition to the spring 34 to release the grip of the clutch on the hub 27 of the hoisting drum 26 and permit the hoisting drum to rotate in the reverse direction by the unwinding of the cable as the load descends by gravity. By manipulating the controlling lever to vary the grip of the friction band 28 on the hub 27 of the hoisting drum, the rapidity of such descent may be governed or the descent checked when desired. The band and hub thus serve as a variable brake for the hoisting drum in the lowering operation.

The hoisting and lowering is controlled by the single lever 12, and if by accident or otherwise the lever be released it will automatically assume the neutral position and hold the load suspended until the lever is again swung to raise or lower it. The mechanism is simple and economical both in construction and operation and can be successfully and efficiently operated by unskilled persons, without danger of accident.

To avoid overwinding the cable in the hoisting operation a limit device is added consisting of circuit breaker contained in the casing 43 operated by the contact of the load or the suspending hook with a loop 44 through which the cable passes, on reaching the limit of the upward movement, and arranged to break the current when the load has risen to the predetermined height.

I claim:

1. In a mechanism of the character set forth, a hoisting shaft having a gearwheel, a hoisting drum loosely mounted on said shaft, a friction clutch fixed on said shaft and arranged to engage said hoisting drum, a motor, a motor shaft having a pinion in mesh with said gearwheel, a brake for said motor shaft, an operating shaft and connections therefrom for controlling said motor, a shifting lever for said clutch, controlled by the operating shaft and a controlling lever for oscillating said operating shaft, adapted in one position to actuate said motor and hoist a load, and in another position to permit the load to lower by gravity and to control such lowering movement frictionally by said clutch and brake.

2. In a mechanism of the character set forth, a hoisting shaft, a gearwheel and a friction clutch fixed thereon, a hoisting drum loosely mounted on said shaft and arranged to be engaged by said clutch, a motor having a motor shaft and a pinion thereon in mesh with said gearwheel, a brake for said motor shaft and a controlling lever and connections therefrom to said motor and clutch, said lever adapted in one position to actuate said motor and engage said clutch with said drum to raise a load, and in another position to stop said motor and hold said drum with the load suspended, and in another position to release said drum and permit the load to lower by gravity and to control such lowering rotations of said drum by said clutch and brake.

3. In a mechanism of the character set forth, a hoisting shaft having a gearwheel and a friction clutch fixed thereon, a hoisting drum loosely mounted on said shaft and arranged to be engaged by said clutch, the latter held normally in such engagement by a spring, a motor having a motor shaft and a pinion thereon in mesh with said gearwheel, a brake for said motor shaft and a controlling lever and connections therefrom to said motor and clutch, adapted in one position to actuate said motor and engage said clutch with said drum to raise a load, and in another position to stop said motor and hold said drum with the load suspended, and in another position to release said drum in opposition to said spring and permit the load to lower by gravity, and to control such lowering rotations of said drum frictionally by said clutch and brake.

In testimony that I claim the invention above set forth I affix my signature hereto.

JOSEPH H. DONAT.